June 7, 1966    O. RUTHNER    3,254,447
APPARATUS FOR THE ARTIFICIAL CULTIVATION OF
PLANTS, BACTERIA, AND SIMILAR ORGANISM
Filed Dec. 26, 1963    3 Sheets-Sheet 1
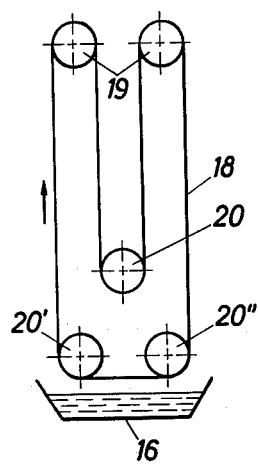
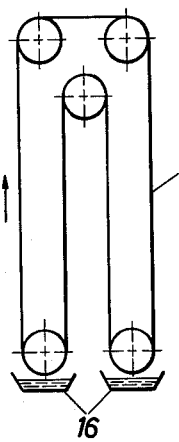
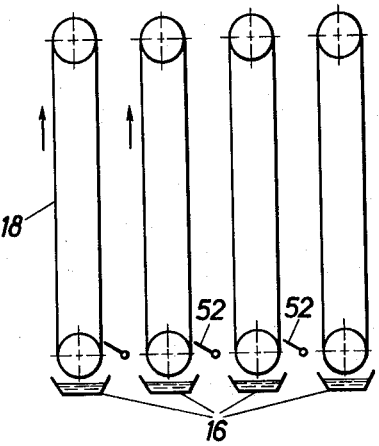
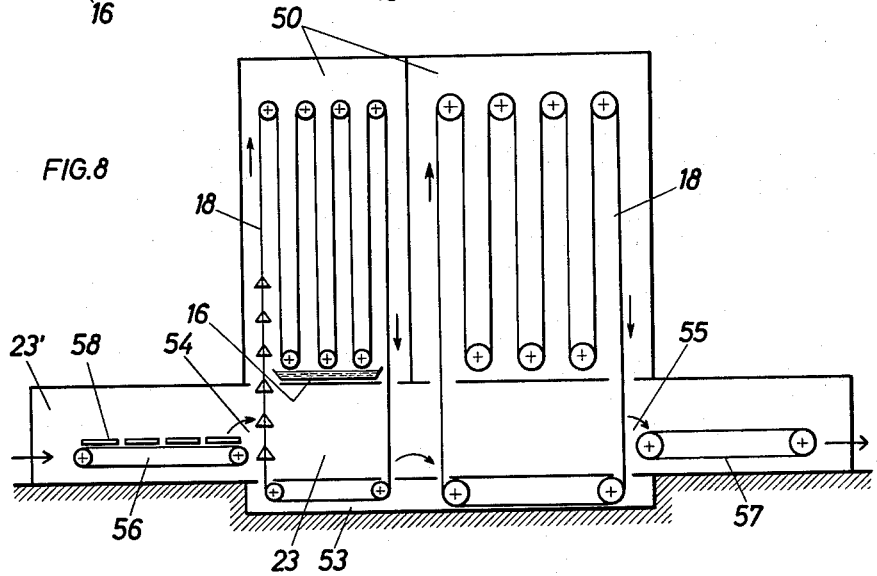
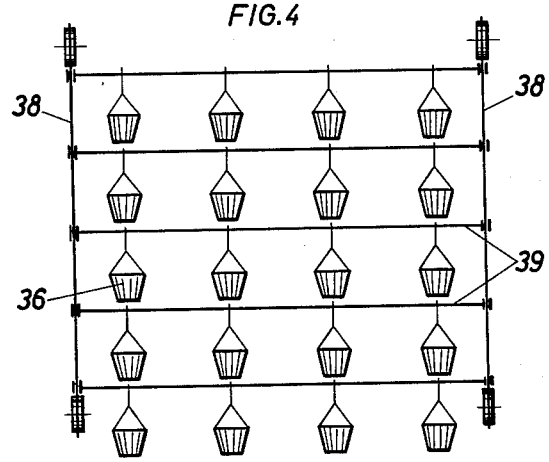
INVENTOR.
OTHMAR RUTHNER
BY
*Emrick + Smiley*
ATTORNEYS June 7, 1966  O. RUTHNER  3,254,447
APPARATUS FOR THE ARTIFICIAL CULTIVATION OF
PLANTS, BACTERIA, AND SIMILAR ORGANISM
Filed Dec. 26, 1963  3 Sheets-Sheet 3

INVENTOR.
OTHMAR RUTHNER
BY
ATTORNEYS

United States Patent Office
3,254,447
Patented June 7, 1966

3,254,447
APPARATUS FOR THE ARTIFICIAL CULTIVATION OF PLANTS, BACTERIA, AND SIMILAR ORGANISM
Othmar Ruthner, 6 Salmgasse, Vienna III, Austria
Filed Dec. 26, 1963, Ser. No. 333,474
Claims priority, application Austria, Jan. 4, 1963, A 73; Jan. 31, 1963, A 764
9 Claims. (Cl. 47—1.2)

This invention relates to an installation for the artificial cultivation of plants and similar organisms, in which installation the entire space can be utilized for the accommodation of plants.

It is an object of the invention to utilize a three-dimensional space for the cultivation, particularly of plants, so that a large amount of floor space is saved.

It is another object of the invention to enable the planting to be carried out independently of the seasons and of climatic conditions. This is enabled by an installation which comprises, according to an essential feature of the invention, a cultivation house comprising at least one cultivation chamber, said cultivation chamber having means for changing the climatic conditions in it, means for conveying the organisms in said cultivation chamber along a looped course combining vertical and horizontal movements, said means comprising a conveyor system having at least one conveyor belt which moves in a vertical direction through the cultivation chamber, and has at least one upper reversing point and at least one lower reversing point, and a feeding station for supplying nutrient substances to the organisms.

Figure 6:
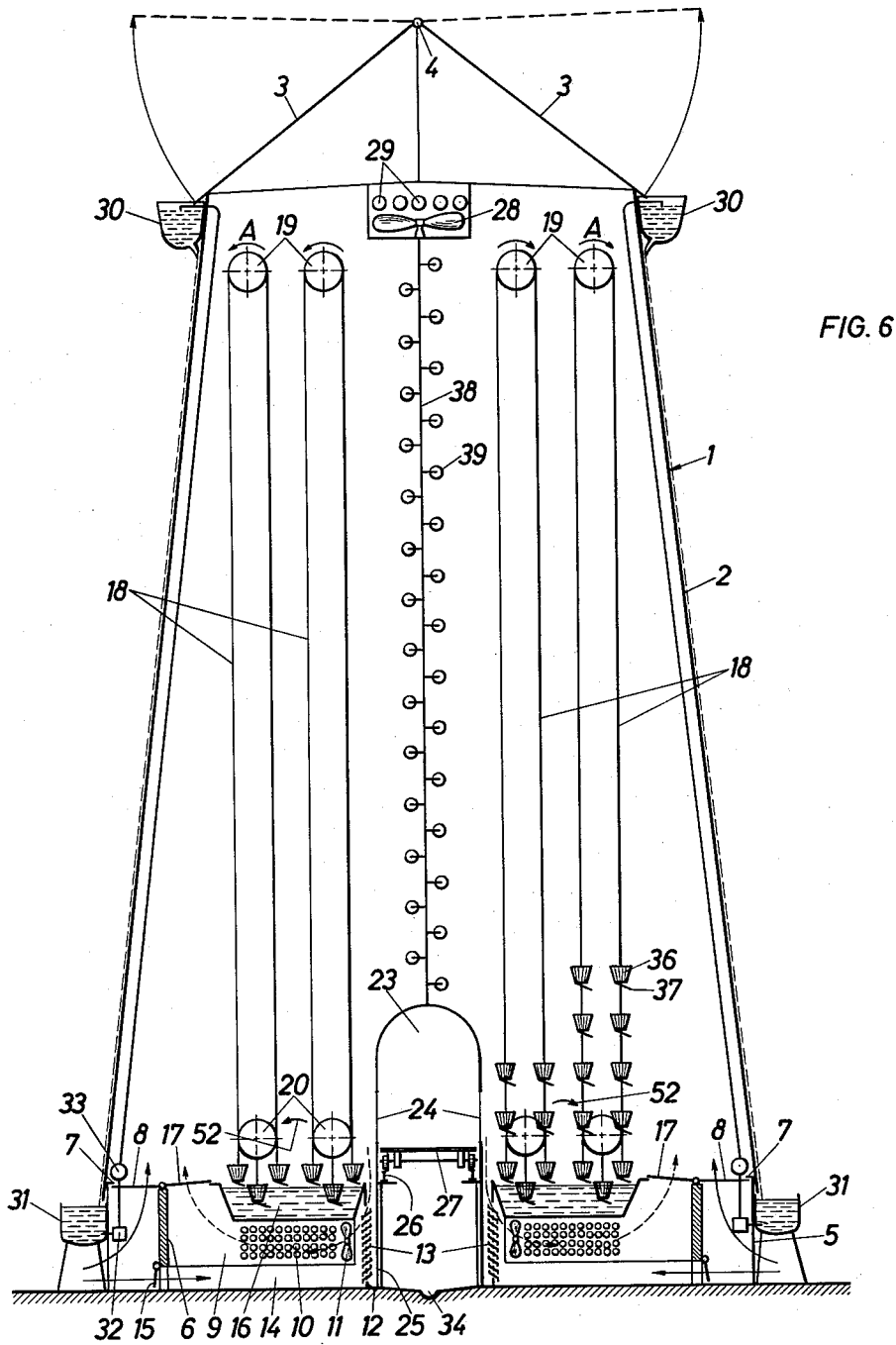

Some embodiments of the installation according to the invention are shown in the drawing. FIGS. 1 to 3 show three different circulation systems for moving the organisms. FIG. 4 is a side elevation showing a portion of the belt, which moves the organisms on supports. FIG. 5 is a side view of a support for plants. FIG. 6 shows an embodiment of the installation in a greenhouse. FIGS. 7 to 10 are longitudinal axial sectional views showing the installation with circulation belts having different configurations.

In all circulation systems, endless belts 18 are used, which may be made in any desired manner and enable an accommodation of a large number of organisms on a relatively large width. The plants may be planted on framed screens, in containers, on supports of peat, moss, or the like, which can be suspended and removed from the belt individually or in rows. For the sake of simplicity, the belt is shown in side elevation only as a line which indicates its path. The belt may consist of a netting, or of a rope ladder having removable rungs, or it may have a similar design.

In the embodiment shown in FIG. 1, the circulation system comprises two looped courses, which are arranged one beside the other and are defined by the upper and lower reversing rollers 19, 20, 20′, 20″ and by which the stock to be cultivated is moved up and down twice and after reaching the lowermost point at the lower reversing roller 20″ returns to the starting roller 20′. During its return path, which may have any desired length determined by the selected distance between the lower reversing rollers, the stock to be cultivated passes through a container 16, which contains a nutrient solution. The return path may be so long as to provide for a sufficiently long residence time, in which the stock to be cultivated can take up the amount of nutrient solution which is required for its nutrition until the stock reaches the nutrient solution container 16 again. The stock follows the circulation of the belt until it is entirely mature, and is then removed from the belt. The belts 18 are circulated by a motor drive.

In the arrangement shown in FIG. 2, the circulation belt returns above the upper reversing rollers.

In dependence on the desired conditions of vegetation any desired number of winding sections may be arranged in series in any desired variations. Containers holding the same or different nutrient solutions, into which the stock to be cultivated is immersed during its passage through the container, may be arranged adjacent to individual or all lower reversing points. The stock to be cultivated may be moved once or repeatedly around the entire circulation path of the conveyor belt.

In the embodiment of the apparatus shown in FIG. 3, the circulation belt 18 is divided into a plurality of individual belts, which move like endless elevators. Each of these belts or only part of them enters a nutrient solution container 16 adjacent to its lower reversing point. For the transfer of the supports, which receive the stock to be cultivated, from one belt to the other, a transfer apparatus 52, which is only diagrammatically shown in the form of a pivoted lever 52, is provided between adjacent endless circulation belts. If the supports consist of bars, which are hooked like the rungs of a rope ladder into hooks of revolving ropes, and from which the containers for receiving the stock to be cultivated are suspended, the transfer device 52 may be provided with pivoted grippers, which lift the bar from one belt and hook them into the other. In this case the number of circulation belts and their speed is calculated so that the stock is mature and can be removed from the belt at the end of its path on the last circulation belt before it reaches the lower reversing point.

As is shown in FIG. 4, simple vessels may be provided, which are spaced in rows around the periphery of the belt. The belt may consist of two or more interconnected, endless ropes 38, between which bars 39 are arranged like rungs, from which the vessels 36 are suspended. The sunrays falling into the greenhouse can then reach also the plants suspended from the rear course of the belts. Alternatively, the belts 18 may consist of grids or nets, from which the vessels 36 may be suspended at selected points with suitable suspending means.

The vessels or boxes may consist of any desired material, such as clay or plastic. Alternatively, absorbent material may be used for receiving the plants, slips or seeds, and this material may take up nutrient solution which is required for the growth of the plant, slip or the like, or for the germination of the seed. The absorbent material may be humus or the like, in which the plants are directly cultivated. As is shown in FIG. 5, the humus may form a part 48 having any desired tubular cross-section, which part is loosely pushed onto the bar 39 and is freely suspended from it. The plants are inserted into this humus support. If the successive supports are closely spaced apart, the plants when in full bloom will form a carpet, which may also be used for decorative purposes, e.g., as a suitable foreground or background.

The circulation belt may be arranged outdoors or may be accommodated in cultivation compartments, in which the conditions which influence the growth, such as the humidity of the air, irradiation, oxygen supply, etc., can be controlled, and different weather conditions, such as rain, wind, etc. can be artificially produced. Such an installation is shown in FIG. 6 in the form of a tower. The installation constitutes a greenhouse and may have a width of about 6–20 meters and a height of about 8–50 meters. The carrying frame of the greenhouse consists of a high, upwardly converging structure 1, which consists of tubular or sectional members and on which side walls 2 of glass are mounted. The upper end of the greenhouse is covered by two flaps 3, which are hinged to a common beam 4 along the longitudinal center of the roof. The glass walls 2 are spaced above the floor so that openings 5 for the access of fresh air are formed below them on both sides of the greenhouse. On the inside of the greenhouse, each of these openings 5 is shielded by a wall 6, at the top end of which a flap 8 is hinged, which engages a sealing strip 7 of the glass wall and controls the admission of fresh air into the greenhouse.

The wall 6 confines an air-conditioning plant 9, which accommodates heaters 10 and a fan 11. Adjustable, preferably pivoted louvers 13 are inserted in that wall 12 of the air-conditioning plant 9 which faces the interior or cultivation chamber of the greenhouse. A well 14 extends along the bottom of the air-conditioning plant 9 and leads to the outside. The outlet end of this well can be closed by a hinged flap 15. The container 16 for accommodating a nutrient solution is inserted from above into the air-conditioning plant 9. The air-conditioning plant 9 communicates past a hinged flap 17 with the cultivation chamber of the greenhouse.

In the present embodiment, the cultivation chamber of the greenhouse is divided into two compartments by a wall 38, which extends at the longitudinal center of the cultivation chamber. Each of these two compartments is provided with a separate air-conditioning plant and a separate circulation system, which may be constructed according to any of the embodiments described hereinbefore. A circulation system of the kind shown in FIG. 3 has been selected. For the sake of simplicity, only two circulation belts per compartment have been shown. More belts could obviously be provided.

The direction of circulation is indicated by the arrows "A." During the circulation, the plants travel through all climatic zones of the greenhouse and are immersed into the nutrient solution in the container 16 adjacent to the lower reversing point. In order to avoid the liquid dripping from the vessels 36 from dropping into the underlying vessel, a baffle, e.g., of polymethacrylate resin, may be provided at the bottom of each vessel 36.

The belts 18 may be upwardly inclined toward the center of the greenhouse. There is no need for baffles in this case because the vessels 36 are not arranged one over the other. In gravel cultures, bacteria, fungi or other pests will develop in the course of time. They are mainly removed with hot steam. For this purpose, hot water is forced through the container 16 for cleaning the gravel cultures when the nutrient solution has been drained. The vessels 36 dip into this not water during th circulation of the belt. In this case, the belt movement may be intermittent so that each vessel 36 remains in the hot water for some time. The gravel cultures may alternatively be cleaned with suitable chemicals.

For the gardener who attends to the plants, a tunnel-like handling chamber 23 is provided between the circulation belts 18. This chamber is confined by transparent material, such a glass or plastic, and has side walls, with windows 24, which can be opened to enable an access to the individual plants, which are in reach. The handling chamber 23 is of special advantage if the carbon dioxide fertilizer is used. This chamber protects the gardener from the atmosphere in the cultivation chamber. Whereas this atmosphere promoted the growth of the plants, it does not provide for wholesome working conditions. Fans, heaters etc. may be used to adjust working conditions which may be desired by a given individual. Stands 25 spaced along the side walls of and disposed in the handling chamber 23 have rails 26 secured to them, along which a platform 27 is movable, which serves as a working table. The gardener places on this platform, e.g., the vessels 36, which have been removed from the belts 18 and contain mature plants, or those vessels which are to be suspended from the belts, or the implements and tools he requires during his work.

A space is provided between the wall 12 of the air-conditioning plant and the side wall of the handling space 23. Sufficient air from the cultivation chamber can flow through this intermediate space to the louvers 13. Hence, the fan 11 can either deliver circulated air from the cultivation chamber or fresh air from the well 14 or a a mixture of both, depending on the position of the louvers 13 and the flap 15. The air thus delivered is heated by the heaters 10 when the same are in operation and is blown into the clutivation chamber when the flap 17 is open. If the flap 8 is open too, the air flowing past the flaps 17 will entrain outer air through the gap opened by the flaps 8. Cooling elements for cooling air which is too hot in the summer may be provided in addition to the heaters 10.

Spaced apart fluorescent tubes 39 are provided throughout the height of the wall.

The greenhouse is vented by opening the flaps 3. The same are shown by way of example in an open position in FIG. 6 in dotted lines. A fan 28 for controlling the circulation of air may be disposed adjacent to the flaps 3 and may be provided with heaters 29 and cooling means, if desired.

To control the intensity of the sunrays which fall into the greenhouse, a liquid film is formed along the glass walls. For this purpose, a container 30, which holds this liquid, is provided adjacent to the top longitudinal edges of the glass walls. Liquid can trickle at an exactly metered rate from this container over the glass walls. The liquid is collected at the lower end of these walls in vessels 31, from which it is returned into the containers 30 by a pump 33 through a plant for cleaning, regenerating and, if desired, cooling or heating the liquid. Oil trickling the glass wall will preserve the structural steelwork. The liquid may be used to control the incidence not only of light but also of radiant heat.

Hence, the climatic conditions in the greenhouse may be automatically controlled and maintained at a selected humidity of the air, temperature and amount of light, and may be influenced by a manual adjustment of the various flaps, moistening and shielding elements.

Particularly, when the operation is carried out without a nutrient solution in the container 16, the belts may be left in a condition of rest. When a movement of a belt for a short time is required in this case in order to move vessels 36 from a higher level into the reach of the gardener, the belt may be moved by hand.

The belts 18 may generally be driven by small motors. These motors impart to the belts a low circulation speed, which is sufficient for the desired purpose. If a higher section of the belt is to be moved quickly into the reach of the gardener, a crank handle may be used for an accelerated movement of the belt.

The nutrient containers 16 may have a horseshoelike configuration in the greenhouse, and a device may be provided for circulating, replenishing and regenerating the nutrient solution.

That part of the floor of the greenhouse which is disposed within the handling chamber 23 has a downgrade toward a gutter 34, which extends along the longitudinal center of the floor and serves for the discharge of water etc. That part of the greenhouse floor which is disposed outside the walls 6 has an outwardly directed downgrade so that any rainwater which has entered can flow off.

Figure 7:
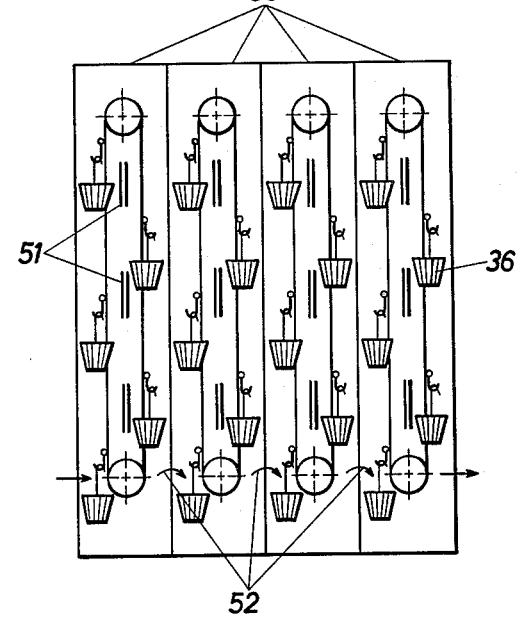

As is shown in FIG. 7, a plurality of cultivation compartments 50 may be disposed one beside the other to be successively passed through by the plant. Each chamber may be provided with means for producing different climatic conditions. For instance, one or more chambers may have means for producing or controlling the required conditions with respect to the humidity of the air, temperature, or brightness or darkness. Devices for producing wind and radiation, and similar devices, may be provided or connected. These devices or their connections are indicated at 51. The above-mentioned devices 52 are provided between adjacent chambers. When the containers for the plants have stayed in a compartment for the prescribed time, these devices engage the containers or the bars 39, from which the containers are suspended, lift them from one conveyor element and insert them into the conveyor element of the succeeding compartment.

The plants or the like may be sorted between the individual compartments.

The individual conveyor elements closed in themselves may be replaced by a conveyor element which moves through the successive compartment and is moved at least once up and down in each compartment around reversing rollers.

In the embodiment of the installation shown in FIG. 8, the cultivation chamber is divided into two cultivation compartments 50, each of which accommodates a circulation belt 18, which extends in vertical loops. Before the beginning of its looped course and after the far end of the same, the belt moves also in vertical direction through the handling chamber 23 disposed below the cultivation chamber. The circulation belt returns in a channel 53, which is disposed below the floor of the handling chamber 23. Two horizontally extending belts 56 and 57, respectively, are provided at the charging point 54 of the first circulation belt and at the discharge point 55 of the second circulation belt. The belt 56 serves as a feeding belt and the belt 57 serves for discharging the completely cultivated stock.

In the installation shown in FIG. 8, the development of the plant from the seed to the crop which is ready to be harvested takes place in three successive periods of time. The first cultivation phase takes place in the section 23′ of the handling chamber 23. In this section, the seeds are inserted into transplanting boxes 58, which are arranged on the belt 56 circulating at a low speed. At the charging point 54, the transplanting boxes are removed from the belt 56 and the plants are transferred into containers arranged on the first circulation belt 18.

At the end of the looped path, the plants leave the first compartment 50 and enter the handling chamber 23, in which they are transferred into larger containers, which are suspended from the second belt, which leads into the second compartment.

The operation taking place in the second compartment is similar to the operation in the first compartment. The mature plants or fruits which are harvested at the discharge point 55 are placed on the discharging belt 57, which moves them to the collecting station.

Figure 9:
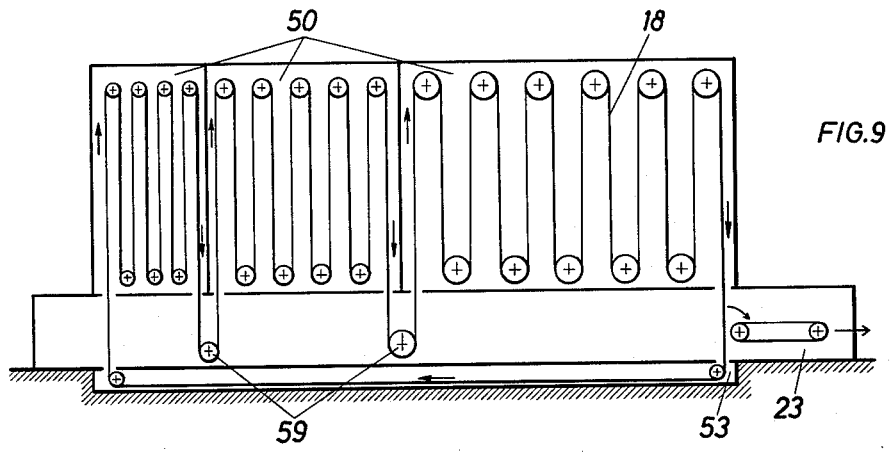

The installation shown in FIG. 9 comprises three cultivation compartments 50 and a single circulation belt 18, which moves through all three compartments and forms between adjacent compartments a loop 59, which extends downwardly into the manipulation space. In this installation, the seed is developed in the first compartment into a plant ready for being transplanted. The process taking place in the second and third compartments is the same as in the two compartments of the preceding embodiment. Adjacent to the loops 59, where the belts move through the manipulation chamber, the containers may be moved further apart by the operator in order to provide space for the development of the plants in the next cultivation chamber. For this purpose, the containers may be inserted, e.g., into a carrier, in which they are simply pushed apart.

Figure 10:
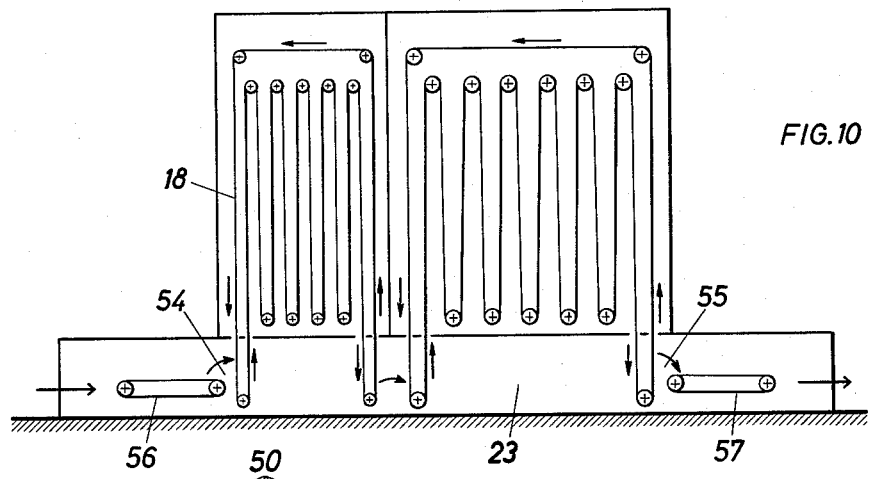

The installation shown in FIG. 10 differs from that of FIG. 8 in that the circulation belts do not return in a channel 53 but above the loops formed in the various cultivation compartments so that a portion of the looped belt lies in the shade when there is sunshine. This is desirable for certain methods of cultivation.

In a modification of the plant of FIG. 8, the vertical revolving belts 18 may be interconnected and their ends may be connected to the horizontal revolving belts 56, 57 to form a single revolving belt, which is returned, as in the embodiment of FIG. 8, in a channel in the floor of the manipulation chamber. The horizontal belt portions obtained at the two ends of the handling chamber and replacing the belts 56, 57 are so long that the gardener has sufficient time for performing the same work as at the belts 56 and 57 in view of the above-mentioned low speed of the belt.

The installation according to the invention may also serve for decorating the walls of buildings. For this purpose, it may assume the form of suitably designed greenhouses, which may be mounted on or countersunk in the outer wall.

What is claimed is:

1. A conveyor system for conveying plants, bacteria and similar organisms for their artificial cultivation, comprising a plurality of upper and lower rollers, at least two of said upper rollers being spaced apart horizontally in different vertical planes, at least one of said lower rollers being positioned below and offset between the planes of said two upper rollers, a wide endless belt extending around said upper and lower rollers in loops occupying space of three dimensions and having a series of a least four substantially vertical courses in two of which the belt travels upwardly and in two of which the belt travels downwardly, container means attached to said belt for holding said organisms, drive means connected to said rollers so as to move the belt and organisms held in said container means along said loops, and nutrient feeding means disposed below certain of said lower rollers and through which pass said container means and organisms held therein.

2. A conveyor system as set forth in claim 1, in combination with a cultivation house including at least one cultivation chamber having means for changing the climatic conditions within it, said conveyor system being disposed within said chamber.

3. The combination set forth in claim 2 wherein said belt returns below said loops to its starting point.

4. The combination set forth in claim 2 wherein said belt returns above said loops to its starting point.

5. The combination as set forth in claim 2 wherein at least one handling chamber is disposed within the cultivation house outside said cultivation chamber for use of an operator in placing and removing organisms and their container means on said belt.

6. The combination as set forth in claim 5 wherein said handling chamber is disposed below the cultivation chamber, the first and final course of the belt extending into said handling chamber, and a channel is formed in the floor of said handling chamber in which a portion of the belt returns from the final course to the first course.

7. The combination as set forth in claim 2 wherein said cultivation house comprises a plurality of cultivation chambers each of which is passed through by said belt.

8. A plurality of conveyor systems each as set forth in claim 1, in combination with a cultivation house including a plurality of cultivation chambers each having means for changing its climatic conditions, each of said conveyor systems being disposed in a separate one of said cultivation chambers, and means for transferring the organisms and their container means from the belt of one compartment to that of another.

9. The combination set forth in claim 8 wherein a manipulation chamber is provided in said cultivation house below said cultivation chambers, said manipulation chamber housing two substantially horizontally extending continuous conveyors one of which leads to the belt of the first cultivation chamber and the other of which leads away from the belt of the last cultivation chamber.

No references cited.

ABRAHAM G. STONE, *Primary Examiner.*

R. E. BAGWILL, *Assistant Examiner.*